US012020551B2

(12) United States Patent
Nevin

(10) Patent No.: US 12,020,551 B2
(45) Date of Patent: Jun. 25, 2024

(54) OCCUPANT MONITORING SYSTEM AND METHOD

(71) Applicant: Shawn Nevin, Maple Grove, MN (US)

(72) Inventor: Shawn Nevin, Maple Grove, MN (US)

( * ) Notice: Subject to any disclaimer, the term of this patent is extended or adjusted under 35 U.S.C. 154(b) by 0 days.

(21) Appl. No.: 17/066,260

(22) Filed: Oct. 8, 2020

(65) Prior Publication Data

US 2021/0027603 A1 Jan. 28, 2021

Related U.S. Application Data

(63) Continuation of application No. 16/381,882, filed on Apr. 11, 2019, now Pat. No. 10,937,298.

(60) Provisional application No. 62/656,082, filed on Apr. 11, 2018.

(51) Int. Cl.
*G08B 21/04* (2006.01)

(52) U.S. Cl.
CPC ..... *G08B 21/0461* (2013.01); *G08B 21/0415* (2013.01); *G08B 21/043* (2013.01); *G08B 21/0469* (2013.01)

(58) Field of Classification Search
CPC ............ G08B 21/0461; G08B 21/0415; G08B 21/043; G08B 21/0469; G01L 1/146; G06V 20/593; B60R 2022/4841; B60R 21/01544; B60R 2022/485
See application file for complete search history.

(56) References Cited

U.S. PATENT DOCUMENTS 3,991,746 A * 11/1976 Hanna .................. A61B 5/1126 600/500
5,410,297 A * 4/1995 Joseph ................... G08B 21/22 340/573.7
5,986,221 A * 11/1999 Stanley ............ B60R 21/01516 177/144
7,331,071 B1 * 2/2008 Cherubini ............. G08B 21/22 5/652
9,449,493 B2 * 9/2016 Shinar .................. A61B 5/6892
9,638,800 B1 * 5/2017 Skowronek ............ G01S 15/42
9,661,931 B2 * 5/2017 Luciano ............... H05B 47/175
D796,046 S * 8/2017 Sadot ........................... D24/186
D796,682 S * 9/2017 Falk ............................. D24/186
D807,512 S * 1/2018 Räisänen ...................... D24/186
10,219,749 B2 * 3/2019 Kim ....................... A61B 5/113
10,292,625 B2 * 5/2019 Shinar .................. A61B 5/6891
2004/0019313 A1 * 1/2004 Childers ................. A61M 1/28 210/252
2004/0262978 A1 * 12/2004 Young ............... B60R 21/01516 297/452.41
2005/0190068 A1 * 9/2005 Gentry ..................... A61B 5/11 340/665
2007/0135982 A1 * 6/2007 Breed ..................... G01S 7/417 701/36
2008/0000304 A1 * 1/2008 Nagle .................... G01B 7/003 73/780
2008/0136226 A1 * 6/2008 Cherubini .............. G08B 21/22 297/217.2

(Continued)

*Primary Examiner* — Rufus C Point
(74) *Attorney, Agent, or Firm* — Skaar Ulbrich Macari, PA

(57) ABSTRACT

An occupant monitoring apparatus, system and method capable of monitoring an occupant of an occupant support or space. The apparatus, system and method utilizes a variable capacitance sensor and control unit to monitor, record and compare signals as a means of monitoring an occupant, a support or a space.

20 Claims, 10 Drawing Sheets

(56) References Cited

U.S. PATENT DOCUMENTS

| | | | | |
|---|---|---|---|---|
| 2008/0169931 | A1* | 7/2008 | Gentry | G08B 21/22<br>600/300 |
| 2010/0039269 | A1* | 2/2010 | Newham | A61B 5/6887<br>340/573.4 |
| 2010/0162824 | A1* | 7/2010 | Jamshidi | G01B 7/22<br>29/592.1 |
| 2014/0371635 | A1* | 12/2014 | Shinar | G08B 21/0211<br>600/595 |
| 2016/0324677 | A1* | 11/2016 | Hyde | A61B 5/01 |
| 2017/0166166 | A1* | 6/2017 | Lindic | B60R 25/30 |
| 2018/0163410 | A1* | 6/2018 | Peace | E04F 13/072 |
| 2019/0178764 | A1* | 6/2019 | Pelssers | A61B 5/442 |
| 2019/0254570 | A1* | 8/2019 | Shinar | A61B 5/4815 |
| 2019/0359334 | A1* | 11/2019 | Riedel | A47C 7/72 |
| 2020/0386630 | A1* | 12/2020 | Ronay | G01L 1/04 |

* cited by examiner

OCCUPANT MONITORING SYSTEM AND METHOD

REFERENCE TO RELATED APPLICATION

This application is a continuation of U.S. patent application Ser. No. 16/381,882, filed Apr. 11, 2019, and entitled "Occupant Monitoring System and Method", which claims the benefit of U.S. Provisional Application No. 62/656,082, filed Apr. 11, 2018, the entire disclosures of which are all incorporated herein by reference.

FIELD

The present invention relates to monitoring systems and methods, and more particularly to an occupant monitoring system and method for sensing a state or state change of an occupant with respect to an occupant support or space.

BACKGROUND

Monitoring of occupants, such as passengers in transportation vehicles, patients in hospitals and nursing homes, and people or animals occupying a particular space has always been an important task. However, the monitoring of these occupants traditionally consisted of visual checks and eventually the use of video cameras that enabled those monitoring the occupants to observe an occupant's state or condition remotely.

Current occupant monitoring systems use antiquated binary (on/off) sensing technologies that are large, bulky, expensive and prone to breakage. Current technology generally consists of a large matt that expands or extends across an entire top surface of a mattress or chair seat. These devices often come into contact with body fluids that then require them to be cleaned and sterilized. The cleaning process often takes time thereby requiring a healthcare facility to purchase additional monitoring devices as substitute or change-out devices that can be used during the cleaning process. Other monitoring devices require patients to be physically connected to the device in order to be monitored. All of the conventional monitoring devices have traditionally been uncomfortable to the occupant or patient. All of the above shortcomings of the conventional monitoring systems create unsatisfactory devices and methods that cause users to frequently abandon their use.

As a result, being able to actively monitor the presence, or absence thereof, and the movement of an occupant is important for various reasons. For patient care, patient movement can be harmful in certain circumstances and can increase the risk of a patient falling and possibly being injured. This is particularly a problem with patients prone to wandering or getting up from a bed or chair while unsupervised. Additionally, there have been instances where a child has been left in a car seat in a hot vehicle. Being able to properly monitor a child in a car seat can mean the difference between life and death. Further, companies waste valuable employee time waiting outside of conference rooms waiting for its occupants to exit the room. Being able to actively monitor a room can eliminate employees departing for meetings prior to the end of a meeting currently occupying the conference room.

There is a need for a new and improved monitoring devices, apparatuses, systems, and methods that can be utilized to monitor occupants, such as passengers in vehicles, people seated in a waiting room, family members and guests seated in a room of a family home, and patients in hospitals, nursing homes, and other care facilities, that is comfortable for occupants, easy to use for those monitoring, can be integrated into other technology, and the like.

SUMMARY

The invention set forth in this specification pertains to a new and improved apparatuses, devices, systems, and methods for monitoring a state or condition of an occupant, such as a passengers in vehicles, people seated in a waiting room, family members and guests seated in a room of a family home, and patients in hospitals, nursing homes, and other care facilities. The invention is used in conjunction with an occupant support such as a bed, chair, wheelchair, gurney, or a couch, and the like. The invention can also be used to monitor animals occupying a bed, stall, or any other space.

It is an object of the invention to provide a new and improved apparatus, device, systems, and methods for monitoring an occupant's state or a change in the occupant's state. The occupant's state may comprise, for example, being in or on a piece of furniture or a seat of a vehicle. The state may also comprise movement or a lack of movement in or on the piece of furniture or the seat of the vehicle they are occupying. The state may also include a particular condition of an occupant or patient that may be determined by location or orientation of the occupant.

It is a further object of the invention that it be generally small and easily placed in a position to monitor an occupant's state. It is a further object of the invention to have a new and improved apparatus, device, system, and method for monitoring an occupant's state without coming into contact with the occupant, thereby reducing the number of times the monitoring device needs to be cleaned or replaced.

The new and improved apparatus, device, system, and method for monitoring an occupant of the present invention may include a sensor that can be positioned under a bed mattress, chair or couch cushion, vehicle seat, or wheelchair seat. The sensor is capable of linearly monitoring an occupant's or patient's state or a change in state. The sensor is capable of monitoring the state or change in state of an occupant or patient by sensing a physical change in the length, width, or thickness of the sensor.

In one example embodiment, the sensor may comprise an electroactive polymer that is able to produce a variable change in circuitry timing and capacitance as a result of a structural change of the sensor. A structural change of the sensor can accomplished as a result of force, such as a pulling, pushing, stretching, or similar force applied to it. The sensor of the present invention is able to detect small changes in the strain or force exerted upon it. The structural changes or characteristics of the sensor are able to be sensed by a control unit that can be used to control another device or action. The types of actions potentially controlled include but are not limited to sounding an alarm of any kind, signaling a monitor such as a healthcare professional, communicate with and control another technology such as a room or vehicle's lighting, sound, temperature, and similar alerting, notifying, and communication systems.

The control unit is also capable of monitoring multiple sensors that can be used to determine an occupant's or patient's location or orientation on an occupant support or in a space such as a room. The sensor and control unit can also be used for monitoring a patient's health and to prevent medical conditions such as bed sores and blot clots.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

Figure 1:
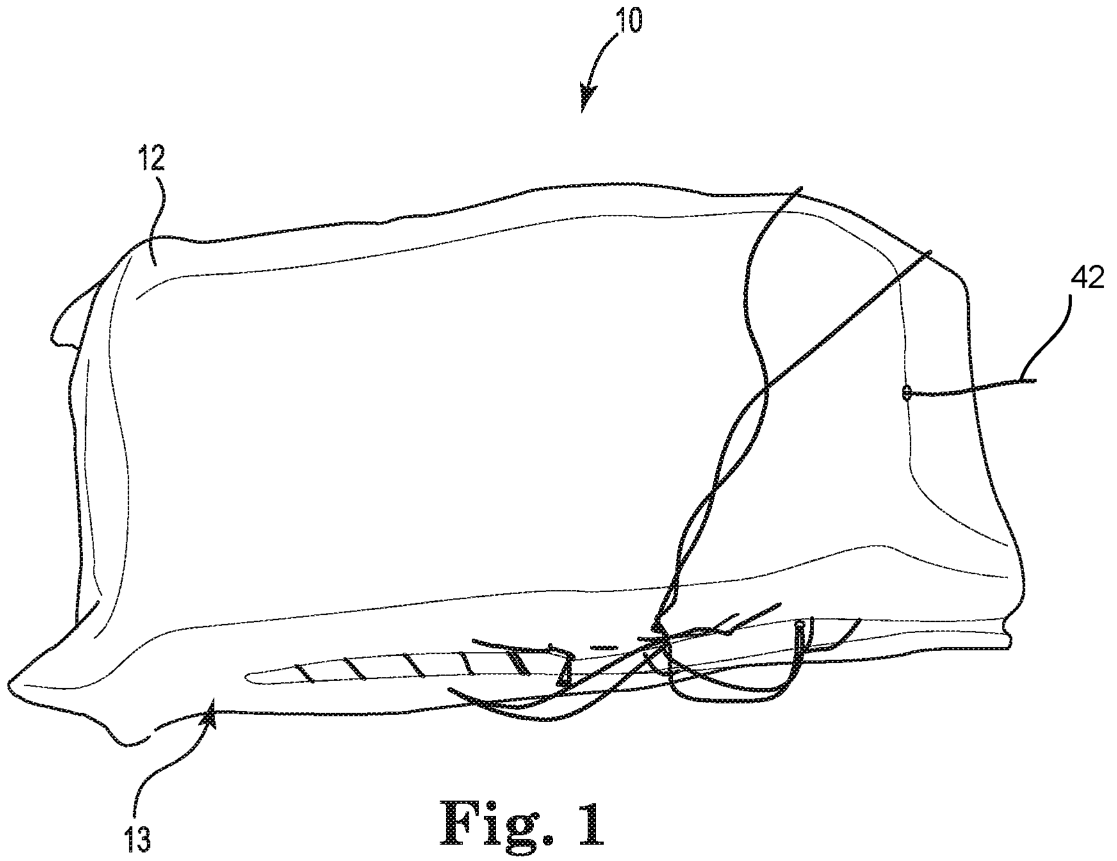
FIG. 1 is a perspective view of an occupant monitoring apparatus with an outer covering, in accordance with embodiments of the present invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the spirit and scope of the invention as defined by the appended claims.

DETAILED DESCRIPTION

In the following descriptions, the present invention will be explained with reference to example embodiments thereof. However, these embodiments are not intended to limit the present invention to any specific example, embodiment, environment, applications, or implementations described in these embodiments. Therefore, description of these embodiments is only for purpose of illustration rather than to limit the present invention. It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Referring generally to FIGS. 1-8, an occupant or patient monitoring apparatus 10 is disclosed. The apparatus 10 is designed to be positioned in or connected to an occupant support or space, such as a bed, chair, couch, seat, gurney, rug, carpet, or other structures or flooring materials capable of being exerted upon or interacted with by an occupant such as a person or animal. The apparatus 10 is positioned and in operative communication with any part of an occupant support such as a mattress, seat cushion, seat portion or seat frame to name a few.

The apparatus 10 is adapted to monitor a state or state change of an occupant or patient with respect to the occupant support or space. The state or state change may comprise an indication of the occupant positioned on or off of the occupant support or space; a movement or lack of movement of the occupant or patient on or in the occupant support or space; an orientation or change of orientation of the occupant in or on the occupant support or space. Other states and state changes are also detectable and should be considered to be within the scope of the present invention.

As particularly illustrated in FIG. 1, in one example embodiment of the invention, the occupant or patient monitoring apparatus 10 includes an outer covering 12 that is made of a flexible or pliable material such as a fabric or similar material. The outer covering 12 may include an access opening 13 that provides access to an interior of the outer covering 12. The access opening 13 can be selectively closed by a closure, such as a zipper, button snap, hook and loop fasteners, or similar closures. The outer covering 12 can be removed and washed as needed.

As illustrated in FIGS. 2 and 3, the outer covering 12 may enclose or house a sensor assembly 14 that is adapted to create or detect, and mechanically amplify, a state or state change of an occupant with respect to the occupant support. In an example embodiment of the invention, the sensor assembly 14 includes a housing or sensor support 15 that supports or houses one or more sensors 30. In one embodiment of the present invention, the sensor 30 is positioned between a first support member 16 and a second support member 18 of the housing 15. The first support member 16 has at least an inner surface 17*a* and the second support member 18 has at least an inner surface 17*b* that are capable of being spaced apart by a biasing member 22.

When the monitoring apparatus 10 is in a monitoring position or location, the first support member 16 is adapted to be positioned against a portion of the occupant support such as a bed or chair frame, while the second support member 18 is adapted to be positioned against a bottom or lower surface of a bed mattress or chair cushion. The occupant or patient monitoring apparatus 10 is able to create a signal as the first support member 16 moves toward or away from the second support member 18. The position or orientation of the first support member 16 and the second support member 18, with respect to a portion of the occupant support or space, or any other structure thereof, is not limited to the description provided herein and one skilled in the art will appreciate that the apparatus 10 will operate similarly if inverted.

The biasing member 22 of the housing 15 may be any material or structure capable of biasing or moving the first support member 16 and the second support member 18 with respect to each other. As illustrated in FIG. 2, the biasing member 22 may be a foam material disposed on the inner surface 17*a* or 17*b* of one of the support members 16 or 18. Alternatively, the biasing member 22 may comprise one or more springs, or similar structures capable of biasing or moving the support members 16 and 18 with respect to each other. Although the biasing member 22 is illustrated as being disposed on the inner surface 17*b* of the second support member 18, it is also contemplated to be disposed on the inner surface 17*a* of the first support member 16.

In one example embodiment of the invention, as illustrated in FIG. 2, a sensor collar or sensor support 24 is disposed or mounted on one of the surfaces of one of the support members 16 or 18. For example it may be disposed on the inner surface 17*a* of the first support member 16. The sensor collar or support 24 may have a free end 25 defining an opening into a cavity 27. The sensor collar or support 24 may be manufactured from any type of polymer or material. Various configurations of the sensor collar or support 24 are possible and the embodiment illustrated in the figures should not be considered limited.

The sensor collar or support 24 is adapted to support one or more sensors 30 capable of monitoring a state or state change of an occupant or patient on, or in, an occupant support. The sensor 30 of the present invention may be an electroactive polymer ("hereinafter EAP") that is capable of sensing the state or state change of the occupant or patient being monitored. In one example embodiment, an end of the sensor 30 may be attached or coupled to the sensor support 24 or to a portion of the housing 15. For example, it may be coupled to the inner surface 17*a* of the first support member 16. A portion of the sensor 30 is positionable over the sensor the support 24 such that the free end 32 of the sensor 30 extends beyond an end of the first support member 16 and the second support member 18 to enable it to be connected to a control system or unit (discussed below).

Figure 2A:
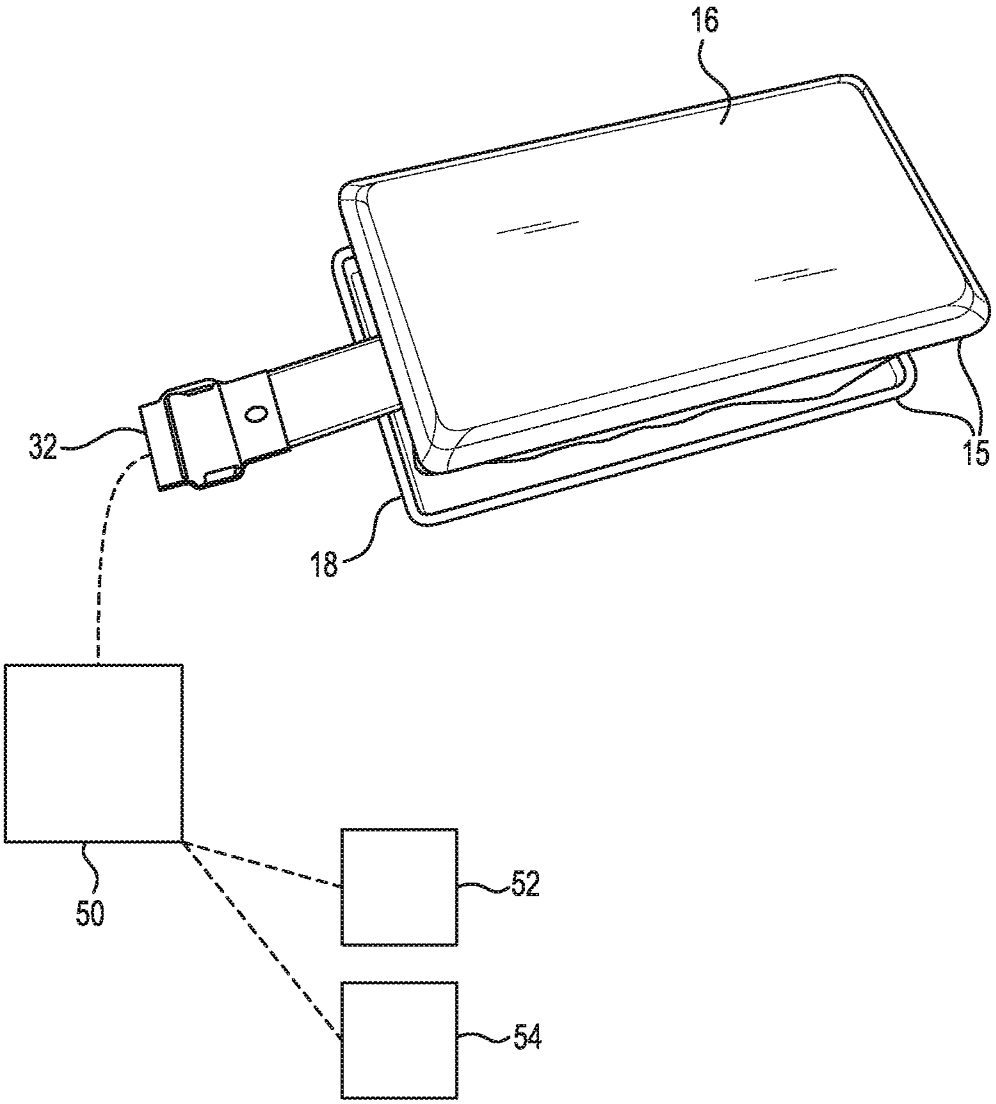
FIG. 2A is a perspective view of an assembled occupant monitoring apparatus, in accordance with embodiments of the present invention.
Figure 2B:
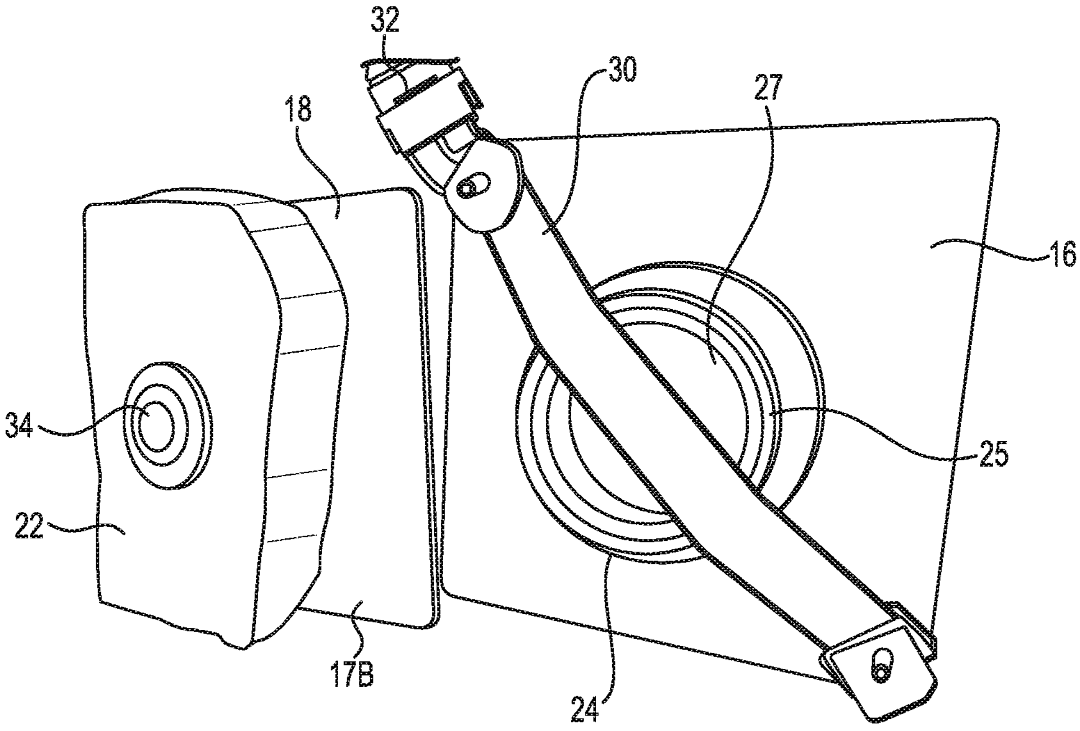
FIG. 2B is a perspective view of an occupant monitoring apparatus with a sensor positioned on a sensor support, in accordance with embodiments of the present invention.

As illustrated in FIG. 2B, in one example embodiment, an actuator 34 may be disposed on the second support member 18 of the housing 15. The actuator 34 may be disposed on or mounted to a portion of the inner surface 17*b*. Turning to FIGS. 2A-2B, a portion of the sensor 30 may extend over the end 25 of the sensor support 24 or it may extend through a portion of the sensor support 24 such that it extends and spans the cavity 27. The cavity 27 of the sensor support 24 creates a support area where the actuator 34 engages and causes displacement or a change in at least a portion of the sensor 30.

Figure 3A:
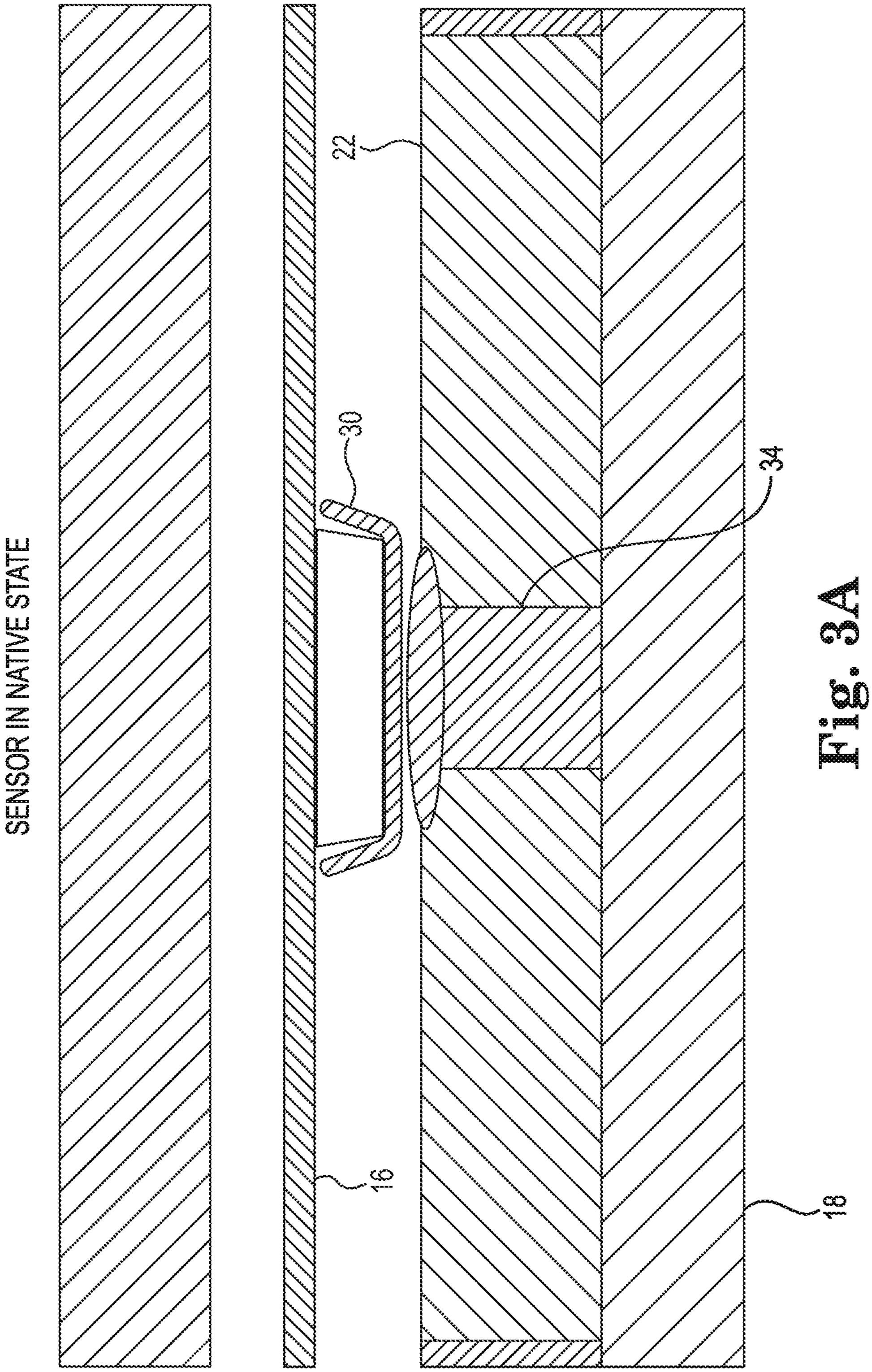
FIG. 3A is a cross section view of an occupant monitoring apparatus in a native or initial state, in accordance with embodiments of the present invention.
Figure 3B:
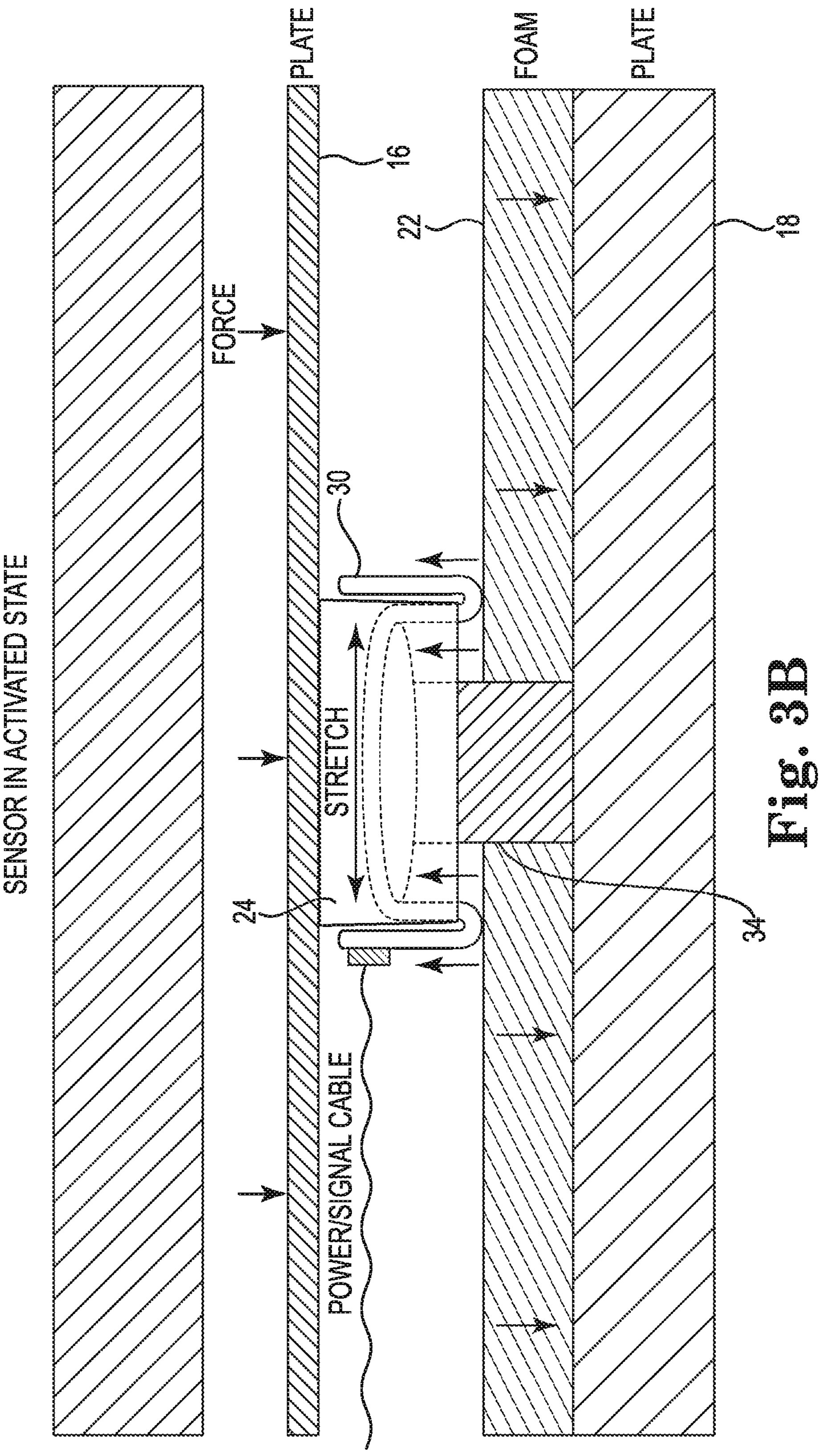
FIG. 3B is a cross section view of an occupant monitoring apparatus in an activated state, in accordance with embodiments of the present invention.
Figure 4:
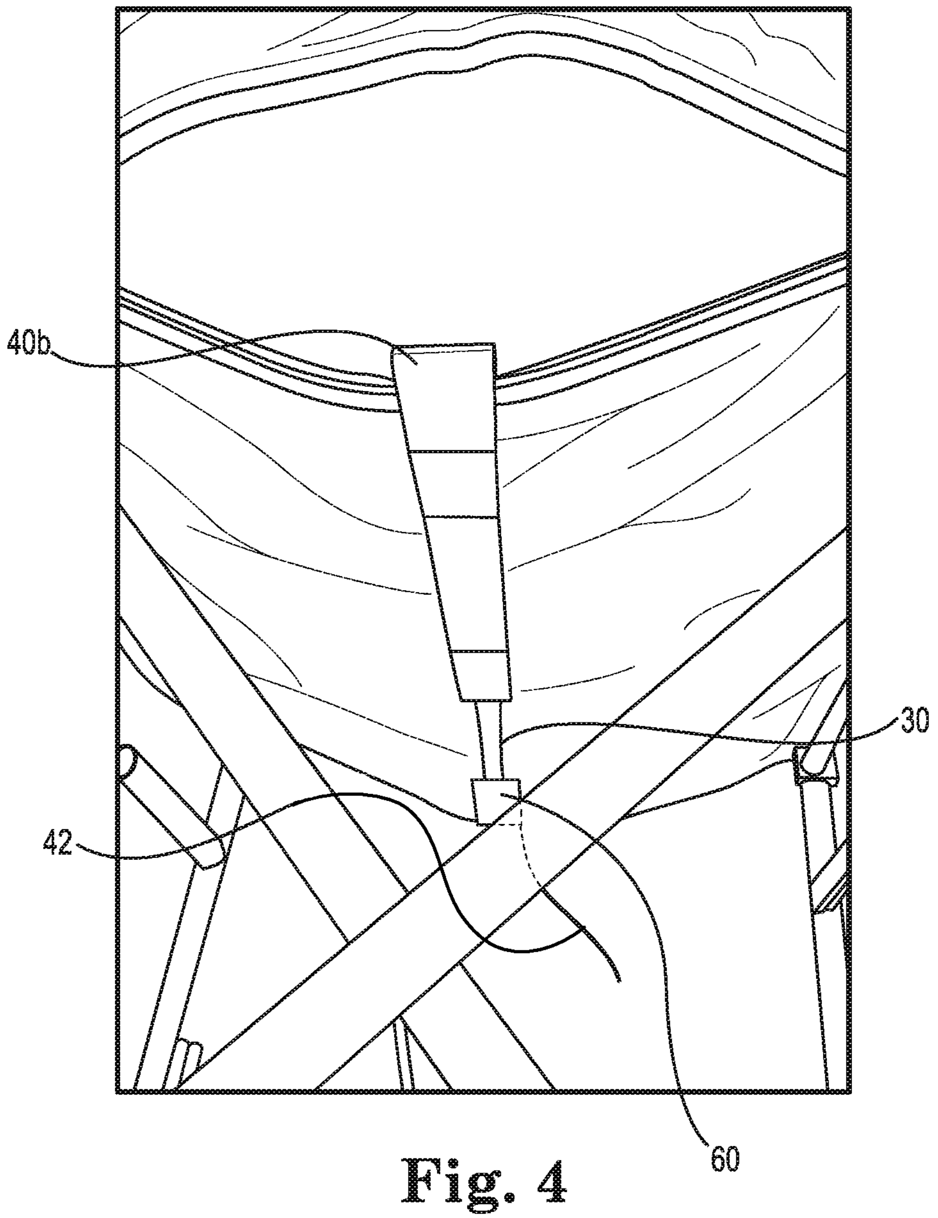
FIG. 4 is a perspective view of an occupant monitoring apparatus connected to an occupant support, in accordance with embodiments of the present invention.

When the support members 16 and 18 are positioned in an operational configuration, as illustrated in FIGS. 2A and 3A-3B, the actuator 34 extends generally toward the first support member 16 and the sensor 30. A portion of the actuator 34 is adapted to engage and exert a displacing force upon at least a portion of the sensor 30 as the second support member 18 moves toward the first support member 16.

As illustrated in FIGS. 2B, and 3A-3B, the actuator 34 may have a length generally greater than a length or thickness of the biasing member 22. The actuator 34 may have a free end 36 that extends beyond or is able to extend beyond the biasing member 22 such that it is able to bias or move into contact with the sensor 30 causing it to displace or change the sensor's shape. As particularly illustrated in FIGS. 3A and 3B, as the free end 36 of the actuator 34 engages the sensor 30 it is able to move, stretch, or compress the sensor 30 into and out of the cavity 27 of the sensor support 24.

Figure 2C:
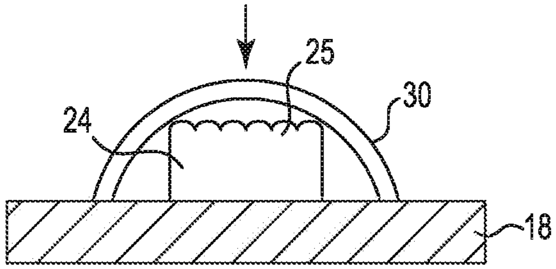
FIG. 2C is a side view of an occupant monitoring apparatus having a contoured sensor support, in accordance with embodiments of the present invention.

In one embodiment of the invention, as illustrated in FIG. 2C, the housing 15 comprises a single support member 16 or 18 and one or more sensor supports 24. The sensor support 24 of this particular embodiment may have a shape or design that permits the sensor 30 to change or conform its shape to the end 25 of the support 24 when under pressure. For instance, the sensor support 24 may have a generally uneven, jagged, or toothed end surface. The sensor 30 is able to extend over the uneven surface and upon pressure of a mattress, seat cushion, or portion of the occupant support, generally take the shape of the uneven surface causing the shape of the sensor 30 to change. In this example embodiment, the outer covering 12 may provide additional protection for the support member 16 or 18 and the sensor 30.

The occupant is monitored due to the unique properties of the sensor 30 and the ability of the control unit 52 to analyze the properties. The sensor 30, an Electroactive Polymer, acts as a flexible capacitor. The flexible capacitor properties of the sensor 30 allow it to act as a displacement-to-capacitance transducer, which is used by the control unit 50 to detect a state or a change in state of an occupant with respect to an occupant support. Generally, as a physical characteristic of the sensor 30 is displaced or changed, as described above, there is a direct change in its capacitance. The correlation between the displacement and the capacitance of the sensor 30 enables the present invention to assign a certain capacitance, or change thereof, to a particular state of the occupant with respect to the occupant support A.

The sensor 30 is connectable, either by wire or wirelessly, to the control unit 50. The control unit 50 has a signal generator that is able to send a signal to the sensor 30 in order to read or poll the sensor's 30 capacitance or it's timing of the EAP sensor circuit. The control unit 50 also includes a signal receiver capable of receiving the capacitance potential of the sensor 30. The control unit 50 is also capable of continuing to send and receive the capacitance potential of the sensor 30 over a period of time. The control unit 50 is able to store the signals received in a storage means, such as a physical or cloud hard drive, for analyzing the capacitance or change in capacitance over time. The control unit 50 also includes a processor that is able to analyze the data from the sensor 30 to determine or calculate the state of the occupant with respect to the occupant support.

Referring to FIG. 2A, the control unit 50 is capable of being programmed to communicate with other technologies for a variety of reasons. For example, the control unit 50 is able to notify an alarm or communication device 52 if a particular state of the occupant is determined. For instance, if an occupant on a mattress does not move over a predetermined amount of time (i.e., no change in capacitance potential is detected by the control unit 50), a nurse may be notified to move the patient in an attempt to avoid bed sores.

Similarly, excessive changes in the capacitance potential of the sensor 30 may indicate an occupant or patient that is moving excessively. Excessive movement can indicate an occupant or patient in distress. Similarly, the control unit 50 may, either directly or through another communication device, notify a nurse to check on the occupant or patient.

Figure 8:
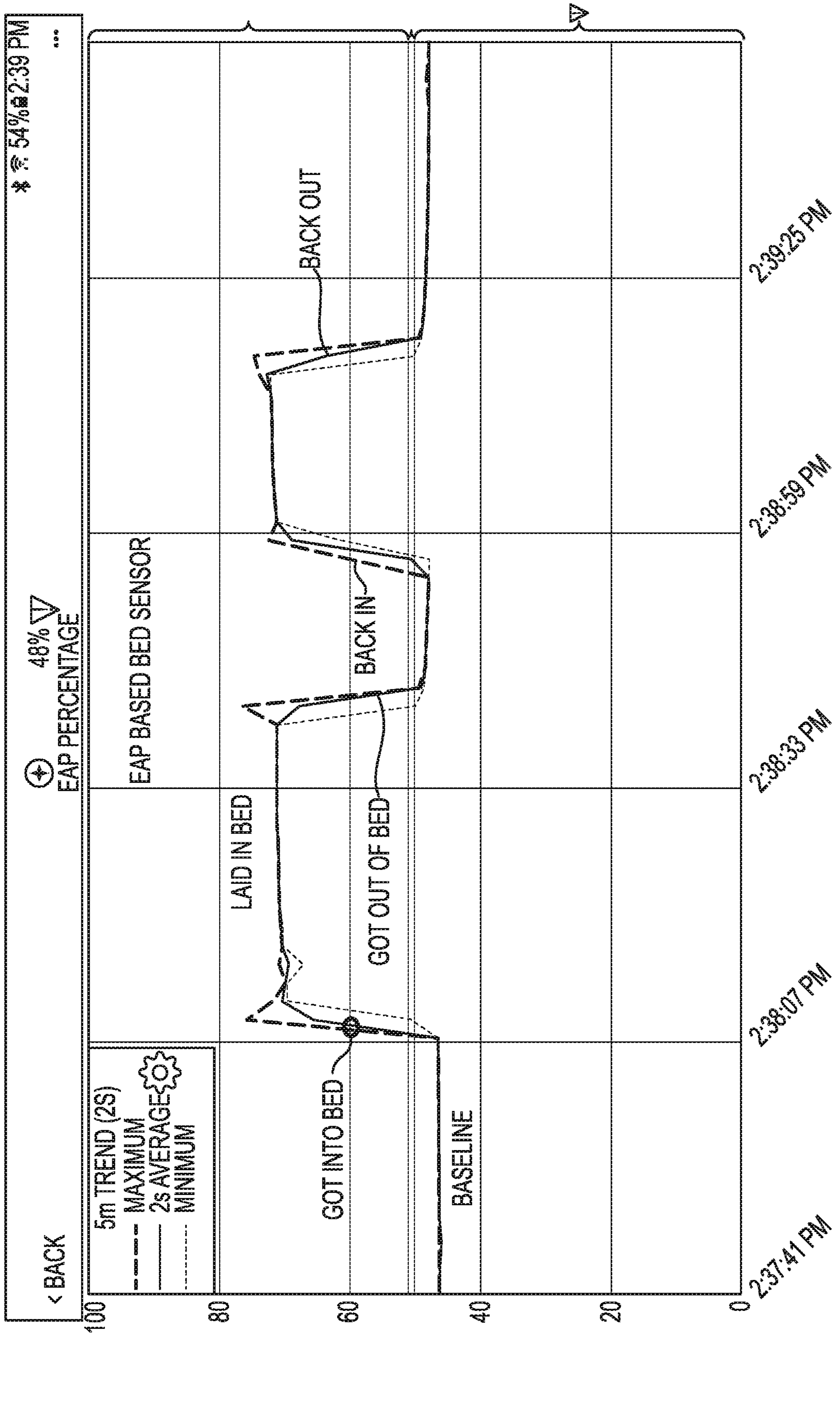
FIG. 8 is a graphic representation of a monitoring of an occupant by reading capacitance potentials, in accordance with embodiments of the present invention.

Referring to FIG. 8, the control unit 50 may be programmed to instantly alert or notify someone if a capacitance potential changes from a high value to a low or base value. This dramatic change in capacitance potential may indicate that an occupant or patient is no longer occupying the occupant support. For instance, it may indicate that a patient is no longer in a monitored bed, wheelchair, or chair and may have fallen or may be in danger of falling.

As briefly described above, the sensor 30 may be displaced, and its capacitance potential changed, in a number of ways. For instance, a portion of the occupant support may press against or engage a portion of the sensor 30 on the sensor support 24. The shape of the sensor support 24 enables the sensor 30 to deform to its shape and thus change the sensor's capacitance potential.

The sensor 30 may also be displaced by the free end 36 of the actuator 34 engaging a portion of the sensor 30. As more or less force is exerted on the occupant support the free end 36 may exert a similar amount of force on a portion of the sensor 30 causing it to stretch or contract, which in turn changes the capacitance potential. Regardless of how the sensor 30 is displaced, the control unit 50 is able to determine a state or change in state of the occupant or patient (i.e., the occupant is in or out of the occupant support; or the occupant has moved or not moved in the occupant support) based upon the change in circuitry timing generated by the change in the capacitance potential of the sensor 30.

The control unit 50 is also able to control a variety of control or actions systems 54, including but not limited to a room or vehicle's lighting, sound, temperature, appliances, security systems, safety systems and similar alerting, notifying, and action systems 54. In an example embodiment of the invention, the sensor 30 is able to be positioned on a child's car seat to sense when a child is occupying the car seat. In the unfortunate event where a parent or caregiver would leave the vehicle, the control unit 50 is able to communicate with the parent or caregiver's cellular phone to determine its proximity to the vehicle and then notify the cellular phone (or other phones) that the child is still in the car seat.

In use, as illustrated in FIGS. 3A-3B and 8, the apparatus 10 may be placed under an unoccupied mattress or chair/seat cushion of an occupant support. The control unit 50 is then able to record a baseline reading of the capacitance potential of the sensor 30. An occupant or patient is then placed on or in the occupant support, causing a portion thereof to either directly displace a portion of the sensor 30 or it causes the first support member 16 and second support member 18 to generally travel toward each. As described above, the movement of the support members 16 and 18 cause the free end 36 of the actuator 34 to engage or disengage at least a portion of the sensor 30, which causes a corresponding change in the capacitance potential of the sensor 30.

In one example embodiment, the control unit 50 may be coupled to the sensor 30 by a plug 32 operatively coupled to the sensor 30. In another embodiment, the control unit 50 may be in wireless communication with the sensor 30. Any type of wireless communication, including Bluetooth, Wi-Fi, and radio transmissions may be used.

In an example embodiment of the invention, as illustrated in FIGS. 4-7, an attachment assembly 60 may be used to releasably attach or couple the monitoring apparatus 10 to a bed frame, couch frame, chair frame, and the like. The attachment assembly 60 may comprise straps, elastic members and the like that have ends that are connectable to a frame or a portion of the occupant support. The attachment assembly 60 may also include couplers and that releasably connect the attachment assembly to the monitoring apparatus 10. The attachment assembly 60 may be adjustable to accommodate occupant support frames of various length or width.

In another example embodiment, the attachment assembly 60 may include a housing having an interior that is able to operatively house and protect the sensor 30. A strap or similar type of extension device may be operatively coupled to the sensor 30 inside the housing. A coupler 40*a* may be connected to the end of the strap while another coupler 40*b* may be connected to a portion of the housing. When the couplers 40*a* and 40*b* are connected to an occupant support for monitoring, any movement of an occupant thereon will cause the occupant support to exert a force on the housing and the strap, thereby exerting a force on the sensor 30 contained therein. The sensor 30 is then able to communicate with the control unit 50 to notify a monitor.

Figure 5A:
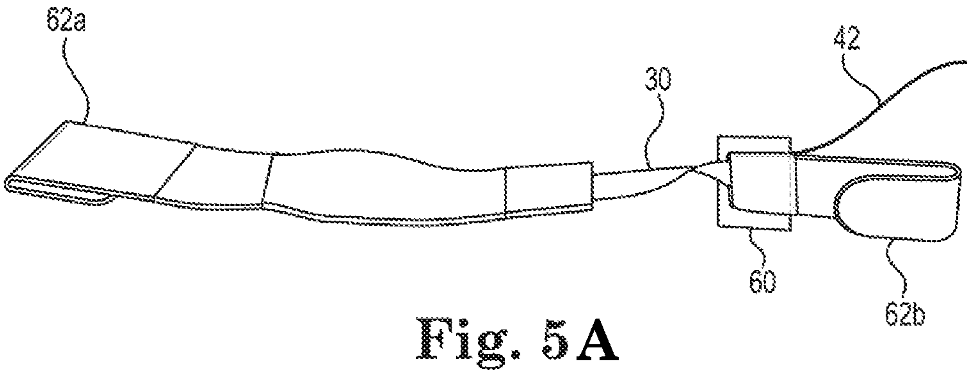
FIG. 5A is a perspective view of an occupant monitoring apparatus having connectors used to connect the sensor to an occupant support, in accordance with embodiments of the present invention.
Figure 5B:
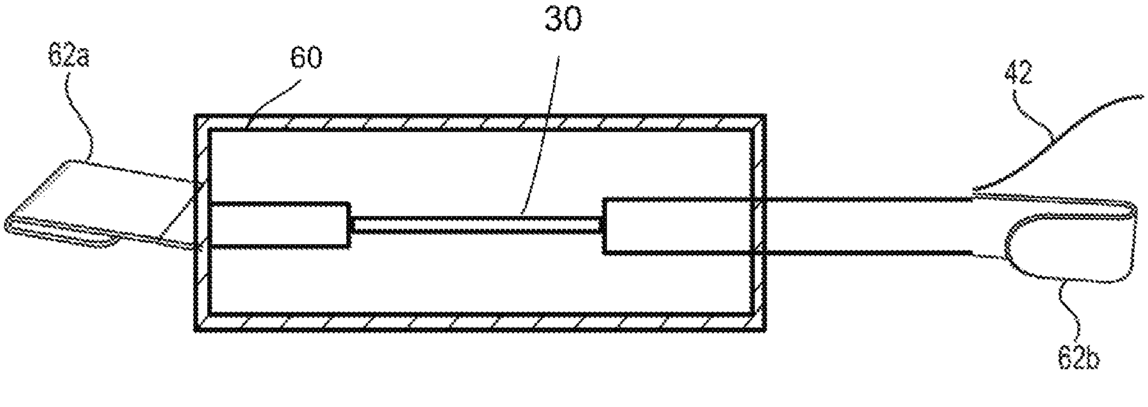
FIG. 5B is a cross sectional view of an occupant monitoring apparatus having housing and connectors used to connect the sensor to an occupant support, in accordance with embodiments of the present invention.

In another embodiment, as illustrated in FIG. 5A, the sensor 30 may be generally elongated, may comprise straps, elastic members and the like to have a length approximately as long as a width or depth of a wheel chair seat. The sensor 30 may include one or more opposed end connectors 40*a* and 40*b* that are releasably connectable to a seat edge or frame of an occupant support, such as a wheelchair. The end connectors 40*a* and 40*b* may comprise hooks, clamps, hook and loop fasteners, screws, or any other means of connecting the sensor 30 to the bottom of the wheel chair seat.

In one example embodiment, the control unit 50 may be coupled to the sensor 30 by a cable 42 operatively coupled to the sensor 30. In another embodiment, the control unit 50 may be in wireless communication with the sensor 30. Any type of wireless communication, including Bluetooth, wi-fi, and radio transmission may be used.

In use of this embodiment, the sensor 30 is placed below or under the wheelchair seat or a flexible seat portion of a chair or vehicle. The end connectors 40*a* and 40*b* are connected to the frame or another part of the occupant support. As an occupant or patient sits in the seat, the bottom of the seat portion or wheelchair contacts or stretches the sensor 30 causing it to strain. The stretch or strain of the sensor 30 causes a change in the capacitance potential and circuitry timing associated the sensor 30. The control unit 50 sends a signal to the sensor 30 and then reads and/or records the current timing signal compared to the first signal or steady state signal. Any change in the capacitance potential or circuitry timing associated with the signal of sensor 30 indicates movement of the occupant or patient.

Figure 6:
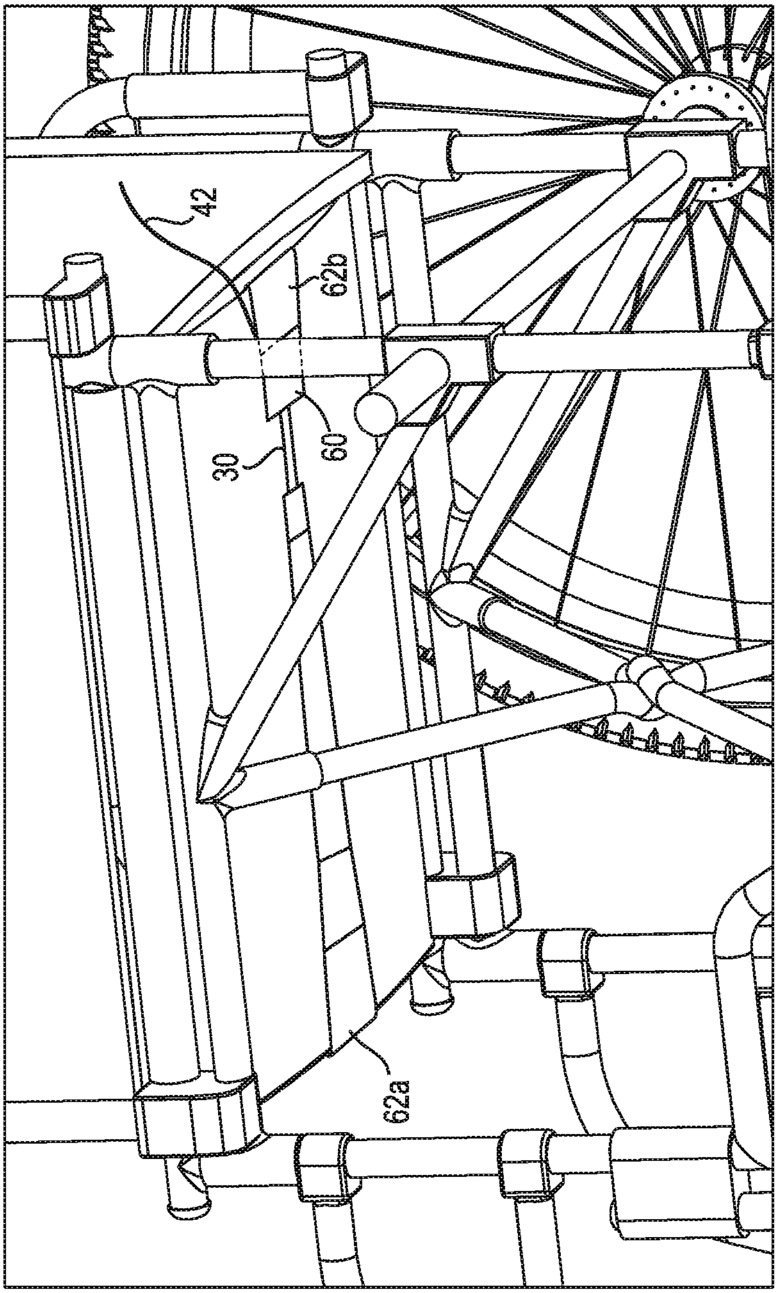
FIG. 6 is a perspective top view of an occupant monitoring apparatus on a wheelchair and in an initial or non-activated state, in accordance with embodiments of the present invention.
Figure 7:
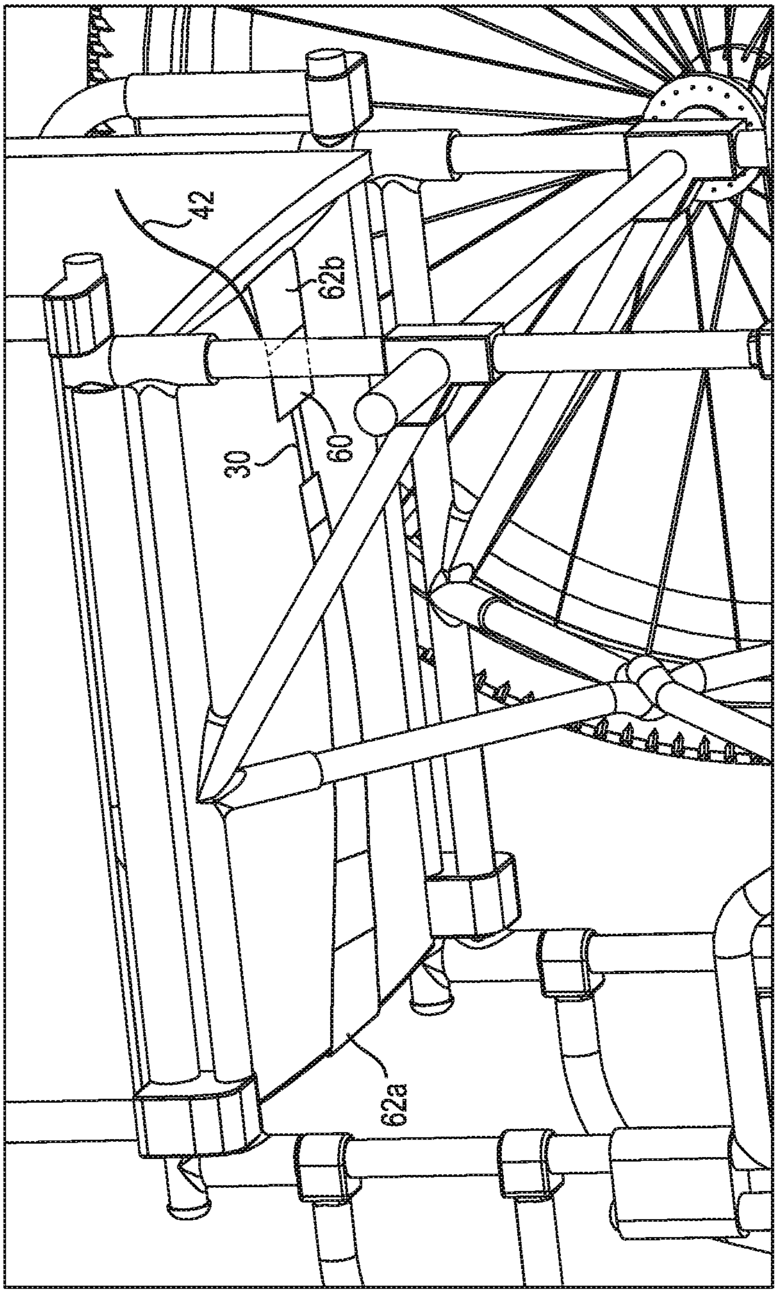
FIG. 7 is a perspective top view of an occupant monitoring apparatus on a wheelchair and in an activated state, in accordance with embodiments of the present invention.

Referring to FIG. 6, when an occupant or patient is not seated or exits the seat portion or wheelchair, the seat moves away from the sensor 30 causing a contraction of the sensor 30. The contraction or relaxing of the sensor 30 leads to a change in the capacitance potential and timing reading of the sensor 30 to a baseline. When an occupant or patient is seated, the seat cushion engages the sensor 30 causing it to stretch or change. The stretching of the sensor 30 leads to a change in the capacitance potential and timing reading of the sensor 30 greater than the baseline.

The control unit 50 is able to compare one or more values of the signals and is able to determine a state of the occupant or patient. Similar to the other embodiments, the control unit is able to trigger an alarm or notify someone, such as a healthcare, that a particular state or change in state has occurred.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

For purposes of interpreting the claims for the present invention, it is expressly intended that the provisions of 35 U.S.C. § 112(f) are not to be invoked unless the specific terms "means for" or "step for" are recited in a claim.

What is claimed is:

1. An occupant monitoring apparatus in operative communication with an occupant support, the apparatus comprising:

at least one sensor assembly comprising at least one stretchable sensor positioned partially within and a portion extending a distance outside of a housing, the housing configured to selectively engage and stretch the at least one sensor upon movement of the occupant support against the movable housing or against the portion extending a distance outside of the housing, the at least one sensor having a capacitance capable of varying when at least one length or width of the stretchable sensor is altered by movement; and at least one connector being connectable to at least a portion of the at least one stretchable sensor and at least removably connectable to a control unit, wherein a state of an occupant on the occupant support can be monitored by monitoring a capacitance of the at least one stretchable sensor.

2. The apparatus of claim 1, wherein the control unit is capable of receiving data related to capacitance of the at least one stretchable sensor through the connector.

3. The apparatus of claim 2, wherein the control unit is capable of correlating the data of the at least one stretchable sensor with an orientation of an occupant with respect to the occupant support.

4. The apparatus of claim 2, further comprising an alert system in operative communication with the control unit to alert when a predetermined data is detected.

5. The apparatus of claim 4, wherein the alert system in operative communication with the control unit alerts when the data indicates a variance of capacitance of the at least one stretchable sensor.

6. The apparatus of claim 1, wherein the at least one stretchable sensor comprises an electroactive polymer.

7. The apparatus of claim 1, further comprising a housing covering, covering at least a portion of the movable housing and the at least one stretchable sensor.

8. The apparatus of claim 7, wherein at least a portion of the housing is coupled to at least a portion of the occupant support.

9. The apparatus of claim 1, wherein the housing further comprises a movable housing having a pair of spaced apart plates and an actuator extending away from at least one of the spaced apart plates.

10. The apparatus of claim 9, wherein movement of an occupant adjusts the occupant support, which engages at least a portion of the movable housing, which causes the at least one actuator to engage the at least one stretchable sensor, thereby changing its capacitance.

11. The apparatus of claim 1, further comprising at least one connector mechanism comprising at least one hooking member configured to engage at least a portion of the occupant support.

12. An occupant monitoring system in operative communication with an occupant support having at least one surface, the system comprising:

at least one sensor assembly comprising at least one stretchable sensor positioned in and extending out of a housing and across a bottom surface of the occupant support, the at least one stretchable sensor being adapted to generate capacitance data related to a change in at least one length or width of the at least stretchable one sensor by movement of the bottom surface of the occupant support; and a control unit capable of receiving capacitance data from the at least one stretchable sensor, wherein a state of an occupant with respect to the occupant support is capable of translating through the surface of the occupant support to at least a portion of the at least one stretchable sensor with its capacitance data being detectable by the control unit.

13. The system of claim 12, further comprising at least one connection mechanism being connectable to and extending between at least a portion of the at least one stretchable sensor and a portion of the occupant support such that movement of the length or width of the at least one stretchable sensor occurs only upon movement of an occupant on the occupant support.

14. The system of claim 13, wherein the connection mechanism comprises a hook member.

15. The system of claim 12, further comprising an alert system in operative communication with the control unit to alert when a predetermined capacitance data is detected.

16. The system of claim 12, further comprising a communication system in operative communication with the control unit to communicate when a predetermined capacitance data is detected.

17. The system of claim 12, wherein the occupant support comprises a piece of furniture.

18. The system of claim 17, wherein the occupant support comprises a car seat.

19. The system of claim 17, wherein the occupant support comprises a wheelchair.

20. The system of claim 17, wherein the occupant support comprises a bed.

* * * * *